Patented July 8, 1952

2,602,803

UNITED STATES PATENT OFFICE 2,602,803

2-ACETOXYTESTOSTERONE ESTERS

Stephen Kaufmann, George Rosenkranz, and Juan Berlin, Mexico City, Mexico, assignors to Syntex, S. A., Mexico City, Mexico, a corporation of Mexico No Drawing. Application September 19, 1949, Serial No. 116,622

3 Claims. (Cl. 260—397.4)

The present invention relates to novel derivatives of the cyclopentanophenanthrene series and to a novel process for the production thereof.

More particularly the present invention relates to the production of $\Delta^4$-androsten-2,17-diol-3-one-diacylates from the corresponding acyl ester of testosterone. The new products are useful as intermediates for the production of therapeutics.

In accordance with the present invention a suitable ester of testosterone as set forth in the following formula:

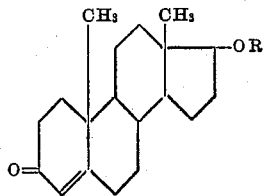

wherein R is selected from the residue of any suitable fatty acid and preferably the lower fatty acids such as acetic, propionic, butyric or an aromatic acid such as benzoic, may be reacted with lead tetracetate in accordance with the following equation:

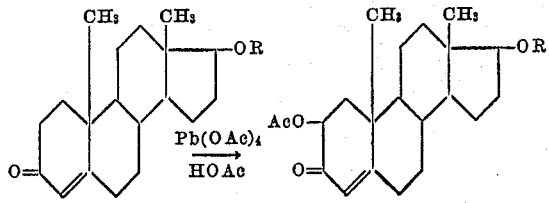

Preferably, as indicated above, the reaction is performed in glacial acetic acid solution and the reaction mixture is heated to a temperature of about 100° C.

The following specific example serves to illustrate but is not intended to limit the present invention:

Example 10 grams of testosterone acetate were dissolved in 150 cc. of glacial acetic acid and 15 grams of lead tetracetate were added. The mixture was maintained at 100° for two and a half hours and then poured into water. The resulting precipitate was filtered and recrystallized first from methanol and then from ethyl acetate. The pure $\Delta^4$-androsten-2,17-diol-3-one-diacetate melted at 202–204° C.

It will be obvious to those skilled in the art that various changes may be made without departing from the spirit of the invention and therefore the invention is not limited to what is described in the specification but only as indicated in the appended claims.

We claim:

1. An ester of testosterone substituted in position 2 by an acetoxy group having the following formula:

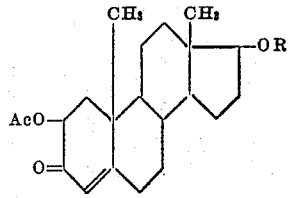

wherein R is the residue of an acid selected from the group consisting of lower fatty acids and benzoic acid.

2. As a new compound $\Delta^4$-androsten-2,17-diol-3-one-diacetate having a melting point of 202–204° C.

STEPHEN KAUFMANN.
GEORGE ROSENKRANZ.
JUAN BERLIN.

REFERENCES CITED

The following references are of record in the file of this patent:

UNITED STATES PATENTS

| Number | Name | Date |
| --- | --- | --- |
| 2,230,772 | Bockmuhl | Feb. 4, 1941 |
| 2,348,221 | Logemann | May 9, 1944 |
| 2,440,874 | Reichstein | May 4, 1948 |